United States Patent [19]

Filippini et al.

[11] Patent Number: 4,506,036

[45] Date of Patent: Mar. 19, 1985

[54] STABLE BORON RESINS OF HIGH SELECTIVE ABSORBENT POWER

[75] Inventors: Andrea Filippini, Prato; Renato Carobbi, Pistoia, both of Italy

[73] Assignee: Sirac S.p.A., Milan, Italy

[21] Appl. No.: 631,104

[22] Filed: Jul. 16, 1984

[30] Foreign Application Priority Data

Mar. 22, 1984 [IT] Italy .............................. 20177 A/84

[51] Int. Cl.$^3$ ............................................. C08J 9/36
[52] U.S. Cl. ..................................... 521/53; 521/149; 525/330.3; 525/337
[58] Field of Search ............... 525/330.3, 337; 521/53, 521/149

[56] References Cited

U.S. PATENT DOCUMENTS

| | | | |
|---|---|---|---|
| 4,266,030 | 5/1981 | Tschang et al. ................. | 521/53 |
| 4,339,500 | 7/1982 | Yanagihara et al. ............ | 521/53 |
| 4,357,311 | 11/1982 | Schutt ........................... | 521/53 |

*Primary Examiner*—Morton Foelak

*Attorney, Agent, or Firm*—Stevens, Davis, Miller & Mosher

[57] ABSTRACT

Stable boron resins of high selective absorbent power and a relative production process; said boron resins are constituted by a polyacrylic matrix bifunctionalized with quaternary ammonium groups and with alkylphenylboric groups in accordance with general formula (I)

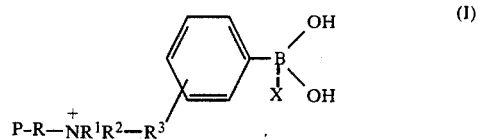

in which ⓟ, R, R$^1$, R$^2$, R$^3$, X are as defined in the text.

The resin (I) is prepared by condensing an amino resin with halophenylboroxine or with haloalkylphenylboroxine.

The resin of formula (I) can be used for purifying lactulose.

7 Claims, No Drawings

STABLE BORON RESINS OF HIGH SELECTIVE ABSORBENT POWER

This invention relates to new boron resins stable in organic solvents and in acid or alkaline aqueous solution, and possessing high selective absorbent power.

More particularly, the present invention relates to boron resins constituted by an acrylic polymer matrix bifunctionalised with quaternary ammonium groups and alkylphenylboric groups, of general formula (I)

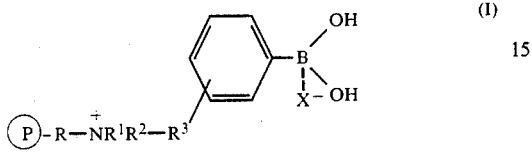

in which:
- $\boxed{P}$ is the polyacrylic matrix;
- R and $R^3$, which can be the same or different, are $-(CH_2)_n-$ where n lies between 0 and 5;
- $R^1$ and $R^2$, which can be the same or different, are $C_1-C_5$ alkyl;
- $X^-$ is an anion chosen from the group consisting of hydroxyl and halides.

The present invention also relates to the process for producing boron resins as defined by general formula (I).

Boron resins based on polystyrene, cellulose, polyamine and silicic matrices have already been described. In all cases these are resins which have been used exclusively in chromatographic analysis [Carbohydrate Research, 43 (1975) 215-224], in view of their chemical instability and low mechanical strength.

We have now discovered that boron resins of general formula (I) have unexpected chemical and mechanical stability, and can be usefully employed in industrial processes.

In particular, we have found that the boron resins according to the present invention exercise an unexpectedly effective selective absorption action in purifying lactulose from its mixtures with other carbohydrates, generally lactose and galactose.

The boron resins of general formula (I) according to the present invention preferably have the following characteristics:
- quaternary ammonim groups bonded to phenylboric or alkylphenylboric anions on an acrylic polymer matrix;
- degree of functionalisation between 1 and 8 milliequivalents of B per gram of dry resin;
- B content between 1 and 8%;

- between 2 and 9 meq/g;
- percentage of cross-linking between 2 and 15%;
- average pore diameter between 500 and 1500 Å;
- specific surface area between 4 and 40 m²/g;
- real density between 1 and 1.5 g/ml;
- apparent density between 0.5 and 1.0 g/ml;
- particle size nbetween 0.1 and 0.5 mm.

The process for producing boron resins of general formula (I) is characterised in that an aminoacrylic resin

in which $\boxed{P}$ is the polymer matrix, and R, $R^1$ and $R^2$ have the aforesaid meanings, and which preferably possesses the following characteristics:

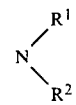

- between 2 and 10 meq/g;
- percentage of cross-linking between 2 and 15%;
- average pore diameter between 500 and 1500 Å;
- specific surface area between 4 and 40 m²/g;
- real density between 0.9 and 1.2 g/ml;
- apparent density between 0.6 and 1.0 g/ml;
- particle size between 0.2 and 0.6 mm;

is pretreated by means of a process comprising regenerating in $Cl^-$ form followed by washing with deionised water until neutral, regenerating in $OH^-$ form, washing with deionised water until neutral, washing and swelling with organic solvents; the amino resin pretreated in this manner is condensed with halophenylboroxine or with haloalkylphenylboroxine (III) and preferably with bromotolylboroxine, in an organic solvent, to obtain the resin (I) in which X is OH, in accordance with the reaction:

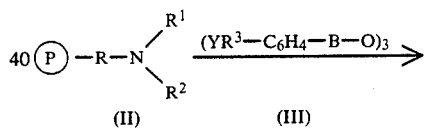

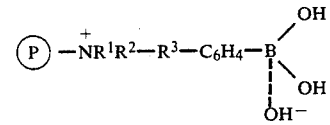

in which Y is halogen.

The characteristics of the boron resins according to the present invention and their production process will be more apparent from the detailed description given hereinafter which relates to a preferred embodiment of the invention.

The process for producing the boron resin of general formula (I) according to the present invention firstly comprises the copolymerisation of an acrylic ester by known methods, using a suitable crosslinking agent, preferably 1,4-divinylbenzene. The acrylic resin which is to constitute the polymer matrix of the resin (I) generally has characteristics lying within the following limits:
- percentage of cross-linking between 2 and 15%;
- average pore diameter between 400 and 1500 Å;
- specific surface area between 4 and 40 m²/g;
- real density between 0.8 and 1.5 g/ml;
- apparent density between 0.5 and 1.1 g/ml;
- particle size between 0.1 and 0.5 mm.

The acrylic resin obtained is subjected to a transamination reaction with variously disubstituted diamines, in accordance with known methods, to obtain the aminated acrylic resin of general formula (II):

(II)

in which Ⓟ, R, R$^1$ and R$^2$ have the aforesaid meanings, and of which the characteristics are as heretofore described.

The aminoacrylic resin (II) is firstly pretreated in order to give it the characteristics which enable it to more easily react in the subsequent condensation reaction with the phenylboroxine (III).

Said pretreatment generally consists of the following sequence of operations:
  regenerating the resin in Cl$^-$ form by treatment with a solution of an alkaline chloride, generally NaCl, at a concentration of between 50 and 150 g/l, and a solution/resin proportion of between 2 and 4 l/kg at a temperature of about 20° C.; the regeneration is completed by treating with a HCl solution at a concentration of between 50 and 150 g/l, and a solution/resin proportion of between 2 and 4 l/kg, at a temperature of about 20° C.;
  washing with demineralised water until neutral;
  regenerating the resin in OH$^-$ form by treatment with a solution of a weak base, generally NH$_3$, at a concentration of between 80 and 100 g/l and a solution/resin proportion of between 4 and 8 l/kg until the halide disappears from the eluate, at a temperature of about 20° C.;
  washing with demineralised water until neutral;
  washing with acetone in the proportion of between 3 and 6 l/kg in order to remove the water from the resin, or with any other solvent able to remove the water;
  drying under vacuum at a temperature of 50°-60° C. for 6-8 hours, to constant weight;
  maintaining in anhydrous dioxane (or another equivalent organic solvent) with a dioxane/resin proportion of between 2 and 4 l/kg, for a time of between 8 and 12 hours at ambient temperature, in order to swell the resin to up to 4 times its initial volume.

The pretreated amino resin is then condensed by reaction with a halophenylboroxine or with a haloalkylphenylboroxine (III), preferably with bromotolylboroxine, to obtain the boron resin (I) in accordance with the aforesaid reaction.

The reaction is conducted in an organic medium, such as dioxane, dimethylformamide or dimethylacetamide, using the organic medium and resin in the proportion preferably of between 5 and 50 l/kg; the weight ratio of the resin to the haloalkylphenylboroxine is preferably between 0.5 and 1.5; the reaction is conducted in the presence of an alkyline iodide, generally NaI or KI, which acts as an alkylation catalyst for the amino group, the weight ratio of resin to alkyl iodide preferably being between 1.2 and 10.

The reaction is conducted at a temperature preferably of between 25° and 55° C. under suitable agitation for a time of between 10 and 30 hours.

On termination of the reaction, the resin is filtered off under vacuum and abundantly washed by carrying out various successive pulping operations and refiltering. It is generally firstly made into a pulp with dioxane with a dioxane/resin proportion of between 3 and 5 l/kg, then with a 2/1 dioxane/0.1N HCl mixture with the mixture/resin proportion preferably between 4 and 6 l/kg, and finally with 0.1N HCl.

In passing from the first to the second and then to the third wash, the resin undergoes progressive swelling, which gives the resin a progressively increasing filterability. At the end of the wash sequence, a cream coloured resin is obtained in the form of perfectly hydrophilic rigid beads.

At this point the resin is regenerated by treatment with a NaOH solution of concentration between 20 and 60 g/l, and a solution/resin proportion of between 2 and 4 l/kg at ambient temperature, followed by treatment with deionised water until neutral.

The boron resins obtained by the described process have the characteristics stated heretofore for the resins of general formula (I).

In particular, these resins have demonstrated high selectivity in absorbing lactulose from solutions which contain it in mixture with other carbohydrates.

A specific example relating to the production of a new boron resin is described hereinafter for illustrative purposes only, and in no way limits the present invention.

EXAMPLE

(a) Preparation of the polyacrylic matrix

A mixture consisting of 50 g of methylacrylate, 2 g of 1,4-divinylbenzene, 1 g of 1,4-ethylvinylbenzene and 1 g of benzoyl peroxide in 250 ml of a 0.2% aqueous solution of polyvinyl alcohol is fed into a 500 ml flask fitted with a mechanical agitator, thermometer and condenser.

It is heated for 20 minutes at 50° C. and then heated overnight at 80° C. under suitable agitation. The product which forms is filtered off, washed with deionised water, alcohol and ethyl ether, and dried at 50° C. in an oven under vacuum for 5 hours.

47 g of copolymer are obtained having the following characteristics:
  percentage of cross-linking 4%;
  average pore diameter 1100 Å;
  specific surface area 10 m$^2$/g;
  particle size 0.2-0.4 mm (90%).

(b) Preparation of the amino resin

The copolymer of stage (a) is swollen for 4 hours in 200 ml of dimethylformamide and is then placed in a 500 ml flask fitted with a mechanical agitator, thermometer and condenser with a calcium chloride tube. 45 g of dimethylethylenediamine and 0.5 g of K$_2$CO$_3$ as catalyst are added.

The mixture is kept overnight at 75° C. under agitation, is then allowed to cool, is filtered, the precipitate is washed with dimethylformamide, with water, with 4% NaOH, then with water until neutral, and finally with alcohol, and is dried in an oven under vacuum at 60° C. for 4 hours. 45 g of amino resin are obtained having the following characteristics:
  N(CH$_3$)$_2$ 6 meq/g of dry resin;
  average pore diameter 1000 Å;
  specific surface area 12 m$^2$/g;
  particle size 0.2-0.4 mm (80%).

(c) Preparation of the boron resin 45 g of acrylo-amino resin from stage (b) are subjected to the following sequence of operations:

- the resin is regenerated in Cl⁻ form by treatment with 130 ml of a NaCl solution of concentration 100 g/l at a temperature of 20° C. for 60 minutes; the regeneration is completed by treatment with 150 ml of a 10% HCl solution at a temperature of 20° C. for 40 minutes;
- the resin is washed with demineralised water until neutral;
- the resin is regenerated in OH⁻ form by treatment with 200 ml of a NH₃ solution of concentration 40 g/l at a temperature of 20° C. for a time of 90 minutes;
- the resin is washed with demineralised water until neutral;
- it is washed with acetone and dried by heating under vacuum at 55° C. for 8 hours;
- 200 ml of dioxane are added to the resin and the resin is kept under dioxane at ambient temperature for 24 hours.

40 grams of the resin pretreated in this manner, corresponding to 160 ml, are fed into a glass flask fitted with a reflux condenser, a CaCl₂ tube, thermometer and mechanical agitator. 1200 ml of dioxane, 43.2 g of bromotolylboroxine and 21.8 g of KI are then added. The mixture is suitably agitated, heated to 50° C. and kept under these conditions for 24 hours.

On termination of the reaction, the mixture is filtered through a Buchner funnel and then washed by means of three successive pulping and refiltration operations, the first pulping being in 500 ml of dioxane, followed by a second pulping in 400 ml of a dioxane/0.1N HCl mixture in a volume ratio of 2/1, followed by a final third pulping in 300 ml of 0.1N HCl.

53 g of resin are obtained having a volume of 200 ml. The resin is of cream colour with a certain quantity of light brown beads, and has the following characteristics:

- degree of functionalisation 4.5 milliequivalents of B per gram of dry resin;
- B content 5%;
- N(CH₃)₂ 7 meq/g;
- percentage of cross-linking 4%;
- pore diameter 1000 Å;
- specific surface area 20 m²/g;
- apparent density 0.7 g/ml;
- real density 1.3 g/ml;
- particle size 0.2-0.4 mm (75%).

We claim:

1. A process for producing a porous boron resin having an average pore size diameter of between 500 and 1500 Å of the formula

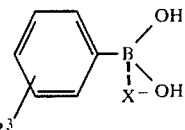

in which
(P) is a polyacrylic matrix;
R and $R^3$, which can be the same or different, are —$(CH_2)_n$— where n is between 0 and 5;
$R^1$ and $R^2$, which can be the same or different, are $C_1$-$C_5$ alkyl;
$X^-$ is an anion chosen from the group consisting of OH and halides, characterised in that an amino resin of formula

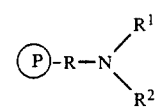

in which (P), R, $R^1$ and $R^2$ are as heretofore defined, is suitably pretreated and then condensed with a phenylboroxine of formula $$(YR^3-C_6H_4-B-O)_3 \quad (III)$$

in which Y is a halogen and $R^3$ is as heretofore defined, in an organic medium in the presence of an alkaline iodide as catalyst at a temperature of between 25° and 55° C., and the resultant resin of formula (I) in which X is a halogen is possibly transformed into the corresponding resin in which X is OH by treatment with an aqueous alkaline hydroxide solution.

2. A process as claimed in claim 3, wherein before being condensed with the phenylboroxine (III), the amino resin of formula (II) is regenerated in Cl⁻ form, washed with demineralised water, regenerated in OH⁻ form, washed with demineralised water, washed with an organic solvent able to eliminate the water, dried and swollen with an organic solvent.

3. A process as claimed in claim 1, wherein the organic condensation medium for the amino resin (II) and the phenylboroxine (III) is chosen from the group consisting of dimethylformamide, dioxane and dimethylacetamide, the organic medium and resin being in the proportion of between 5 and 50 l/kg.

4. A process as claimed in claim 1, wherein the amino resin (II) and the phenylboroxine (III) are reacted in a weight ratio of between 0.5 and 1.5.

5. A process as claimed in claim 1, wherein the weight ratio of the amino resin (II) to the alkaline iodide is between 1.2 and 10.

6. A process as claimed in claim 1, wherein the transformation of the resin (I) in which X is a halogen into the resin (I) in which X is OH is conducted by treatment with an aqueous NaOH solution of concentration between 20 and 60 g/l.

7. A process as claimed in claim 1, wherein the phenylboroxine is bromotolylboroxine.

* * * * *